US008348645B2

(12) United States Patent
Kurylowski et al.

(10) Patent No.: US 8,348,645 B2
(45) Date of Patent: Jan. 8, 2013

(54) BALANCED PRESSURE, VARIABLE DISPLACEMENT, DUAL LOBE, SINGLE RING, VANE PUMP

(75) Inventors: Alexander J. Kurylowski, Rockford, IL (US); Anita I. Jacobs, Roscoe, IL (US)

(73) Assignee: Woodward, Inc., Fort Collins, CO (US)

( * ) Notice: Subject to any disclaimer, the term of this patent is extended or adjusted under 35 U.S.C. 154(b) by 820 days.

(21) Appl. No.: 12/538,926

(22) Filed: Aug. 11, 2009

(65) Prior Publication Data

US 2011/0038745 A1 Feb. 17, 2011

(51) Int. Cl.

| | |
|---|---|
| ***F04C 2/00*** | (2006.01) |
| ***F04C 14/18*** | (2006.01) |
| ***F04C 28/18*** | (2006.01) |
| ***F16N 13/20*** | (2006.01) |
| ***F01C 20/18*** | (2006.01) |

(52) U.S. Cl. .............. 418/15; 418/106; 418/29; 418/30; 418/31

(58) Field of Classification Search .................. 418/106, 418/15, 29–31

See application file for complete search history.

(56) References Cited

U.S. PATENT DOCUMENTS

| | | | | |
|---|---|---|---|---|
| 3,103,893 | A | 9/1963 | Henning et al. | |
| 3,223,047 | A | 12/1965 | Toy | |
| 3,306,224 | A | 2/1967 | Roberts | |
| 4,925,372 | A * | 5/1990 | Hansen | 418/15 |
| 5,017,098 | A * | 5/1991 | Hansen et al. | 418/15 |
| 5,064,362 | A * | 11/1991 | Hansen | 418/15 |
| 5,141,418 | A * | 8/1992 | Ohtaki et al. | 418/30 |
| 5,466,135 | A * | 11/1995 | Draskovits et al. | 418/15 |
| 5,738,500 | A * | 4/1998 | Sundberg et al. | 418/30 |
| 7,247,008 | B2 * | 7/2007 | Clements et al. | 418/30 |
| 2004/0197218 | A1 * | 10/2004 | Wu et al. | 418/15 |

FOREIGN PATENT DOCUMENTS

| | | | |
|---|---|---|---|
| JP | 06-30480 | U | 4/1994 |
| KR | 10-1998-0060571 | A | 10/1998 |
| KR | 10-2001-0096163 | A | 11/2001 |

* cited by examiner

*Primary Examiner* — Mary A Davis
(74) *Attorney, Agent, or Firm* — Reinhart Boerner Van Deuren P.C.

(57) ABSTRACT

A pump including a pressure plate having two inlets and outlets, wherein each inlet has an auxiliary intake port in fluid communication with the inlet, and each outlet has an auxiliary discharge port in fluid communication with the outlet, and a cam/rotor assembly attached to the pressure plate. The cam/rotor assembly includes a rotatable cam having an opening, a rotor within the cam opening, the rotor having multiple radial slots, and multiple vanes that move within the slots, wherein a pumping chamber is defined by a space between rotor and cam. Rotor rotation within the cam causes the vanes to extend and retract within the pumping chamber. The movement of the vanes discharges into the outlets and auxiliary discharge ports a fluid drawn into the pumping chamber via inlets and auxiliary intake ports. The auxiliary inlet and auxiliary discharge ports reduce pressure pulsations in a variable displacement dual-lobe vane pump.

17 Claims, 4 Drawing Sheets

BALANCED PRESSURE, VARIABLE DISPLACEMENT, DUAL LOBE, SINGLE RING, VANE PUMP

FIELD OF THE INVENTION

This invention relates to pumps generally, and more particularly to variable displacement vane pumps.

BACKGROUND OF THE INVENTION

Positive displacement pumps, specifically vane-type positive displacement pumps, have found uses in the fuel systems of gas turbine engines. Typically, these vane pumps include a slotted rotor configured to accept closely fitted but free moving vanes. The rotor may be splined to accept a splined pump drive shaft. In some vane pumps, a lobe shaped cam ring surrounding the rotor defines at least one pumping chamber. Pressure plates may be positioned on either side of the cam ring/rotor assembly. Typically, the pressure plates include flow passages (i.e., inlets and outlets) for fluid entering and leaving the pumping chamber.

The pumping cycle is started when the rotor turns as the drive shaft is rotated. The centrifugal force acting on the vanes causes them to slide outward, or extend, in the rotor vane slots until they contact the contoured cam ring. As the rotor turns, the vanes "track" against the contour of the cam ring. During the intake portion of the cycle, when fluid is drawn into the pumping chamber, the clearance between the rotor and the cam ring increases and fluid is taken in to fill the spaces between the vanes left by the rising cam. This is also known as the intake cycle.

At the point where the vanes reach the maximum extension, the cam blends into the major diameter. The vanes, after passing through the major dwell portion of the cam, begin to retract on the descending cam contour. As the space between the cam ring and the rotor decreases, fluid is forced out of the spaces between the vanes by the falling cam contour. This is also known as the discharge cycle.

The displacement of dual-lobe cam ring vane pumps can be varied by rotating the cam ring. However, one problem associated with dual-lobe variable displacement pumps is pressure pulsation in the transition region. This may occur in the transition from inlet to discharge when there is insufficient discharge area relative to the compression rate, thus producing a rapid increase in pressure. Another problem with dual-lobe variable displacement pumps is cavitation in the transition region from discharge to inlet. This may occur when there is insufficient fill area relative to the volume expansion rate, thus producing a rapid decrease in pressure. Both of these problems expose the pump components to severe mechanical stresses which can reduce the reliability and the lifetime of the pump.

It would therefore be desirable to have a variable displacement pump, with a dual-lobe cam ring, that reduces or eliminates cavitation and pressure pulsation during pump operation.

Embodiments of the invention reduce or eliminate the aforementioned cavitation and pressure pulsation. These and other advantages of the invention, as well as additional inventive features, will be apparent from the description of the invention provided herein.

BRIEF SUMMARY OF THE INVENTION

In one aspect, the invention provides a pump that includes a pressure plate having two inlets and two outlets, wherein each inlet has an auxiliary intake port in fluid communication with the inlet, and each outlet has an auxiliary discharge port in fluid communication with the outlet, and a cam ring/rotor assembly adjacent to the pressure plate. The cam ring/rotor assembly includes a rotatable cam ring having an opening, a rotor disposed within the cam ring opening, the rotor having a plurality of radial slots, and a plurality of vanes configured to move within the radial slots, wherein a pumping chamber is defined by a space between the rotor and the cam ring. Furthermore, the rotation of the rotor within the cam ring causes the plurality of vanes to radially extend and retract within the pumping chamber, and the movement of the vanes is configured to discharge into the outlets and auxiliary discharge ports a fluid drawn into the pumping chamber via the inlets and auxiliary intake ports.

In another aspect, the invention provides a pump that includes a pair of pressure plates, each having a first inlet and a first outlet, a cam ring having a dual-lobed opening and a handle configured to rotate the position of the cam ring, and a rotor having a plurality of radial slots and having a notch between each adjacent pair of radial slots, wherein the rotor is configured to rotate within the dual-lobed opening. The pump further includes a plurality of vanes disposed within the rotor slots, the vanes configured to move within the slots, wherein the cam ring and rotor are disposed between the pair of pressure plates, and wherein the rotation of the rotor and the movement of the vanes cause the intake of a fluid from the inlet and the discharge of the fluid to the outlet.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

In a standard dual lobe vane pump in the inlet and discharge transitions the cam is has a very low gain (Dvol/Ddeg), and the high gain portion of the cam occurs when the ports have a relatively large area. Inherent to the variable concept, when the cam is rotated the high gain portion of the cam now occurs in the transition region when the port openings are very small. A second set of ports have been added to increase the available area to either port the flow in (as required in the discharge to inlet zone) or port the flow out (as required in the inlet to discharge zone).

Figure 1:
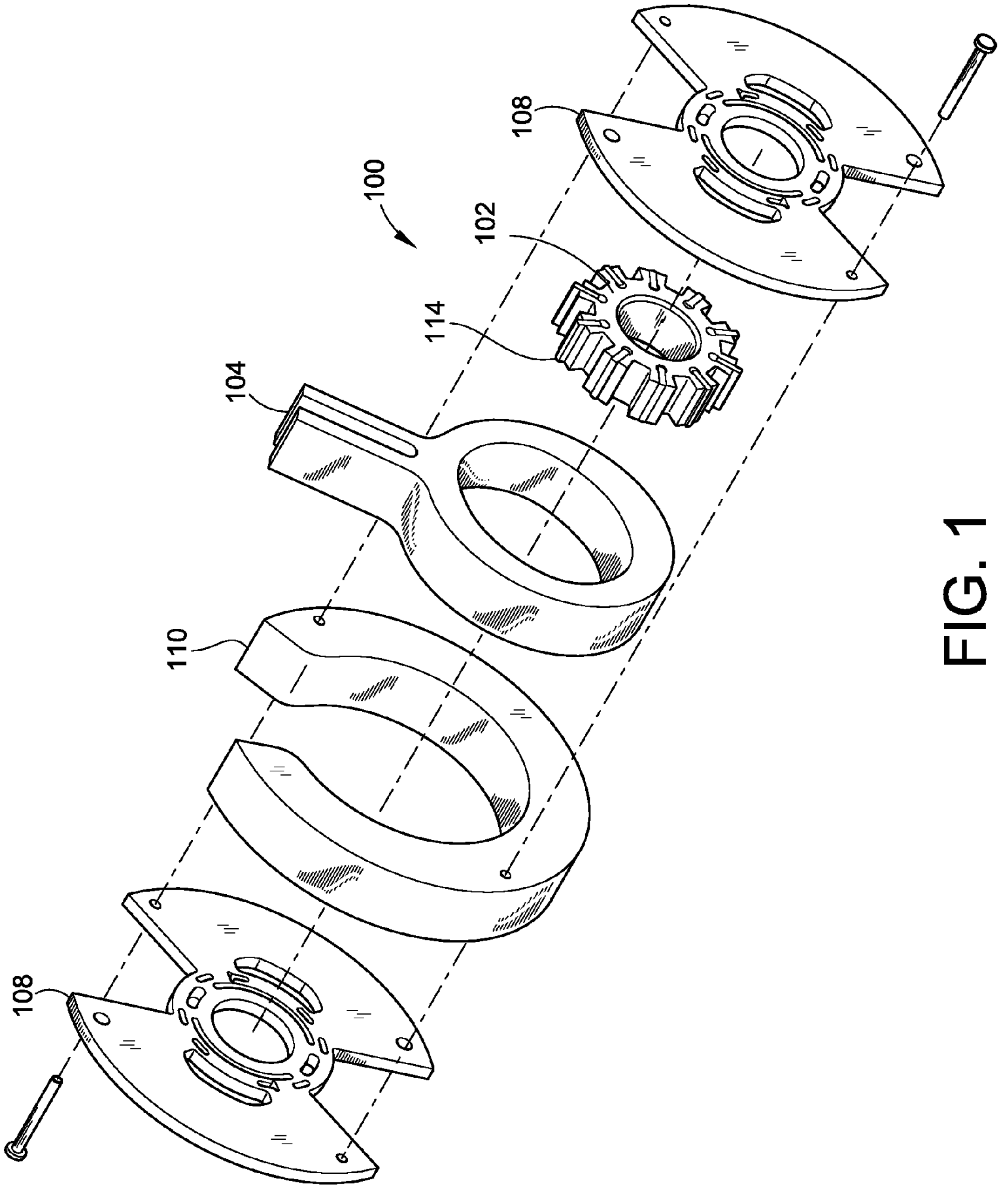
FIG. 1 is an exploded pictorial view of a pump assembly, according to an embodiment of the invention.

FIG. 1 illustrates an exploded view of a balanced pressure, variable displacement, dual lobe, single ring vane pump 100 according to an embodiment of the invention. In this embodiment, the vane pump 100 includes the rotor 102 having a plurality of radial slots, wherein the rotor 102 is disposed within a cam ring 104. The rotor 102 and cam ring 104 are sandwiched between two pressure plates 106, 108, and are axially and radially positioned within a central opening of a spacer 110. In an embodiment of the invention, the rotor 102 is configured to be driven by a splined drive shaft (not shown), which may be attached to a motor (not shown). Pins may be used to align the pressure plates 106, 108 with the spacer 110.

Figure 2:
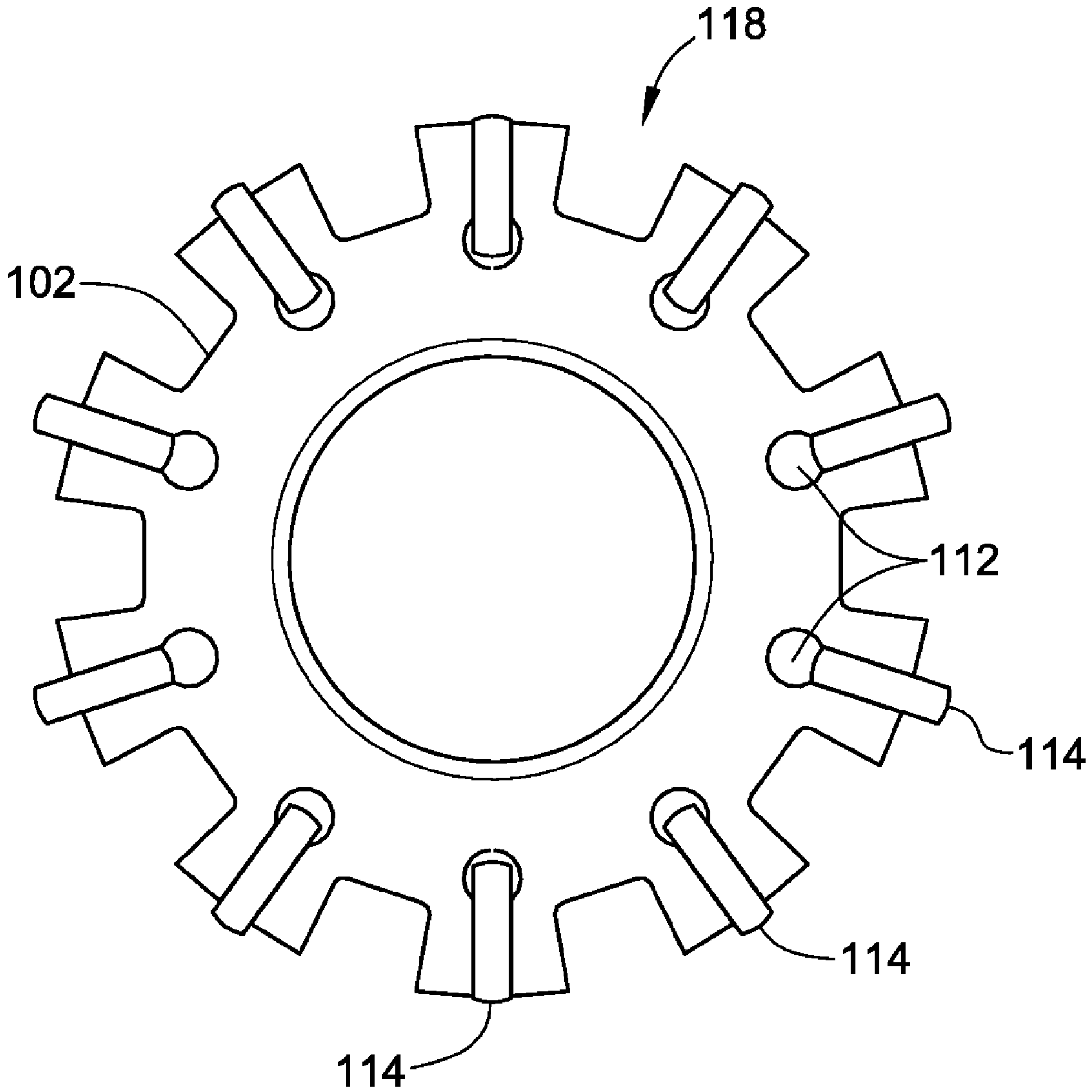
FIG. 2 is a plan view of a rotor according to an embodiment of the invention.

FIG. 2 illustrates the rotor 102 according to an embodiment of the invention. The rotor 102 has ten radial slots 112, each configured to house a vane 114. However, in alternate embodiments of the invention, the rotor 102 may have more or less than ten slots 112. In the embodiment shown, the radial slots are uniformly spaced around the circumference of the rotor 102. At its center, the rotor 102 further includes a circular opening 116, which may be splined to accept the drive shaft (not shown). Between each pair of adjacent slots 112 is a cut out or notch 118. The slots 112 and vanes 114 are configured such that the vanes 114 are close-fitting, but free to extend and retract radially within the slots 112.

Figure 3:
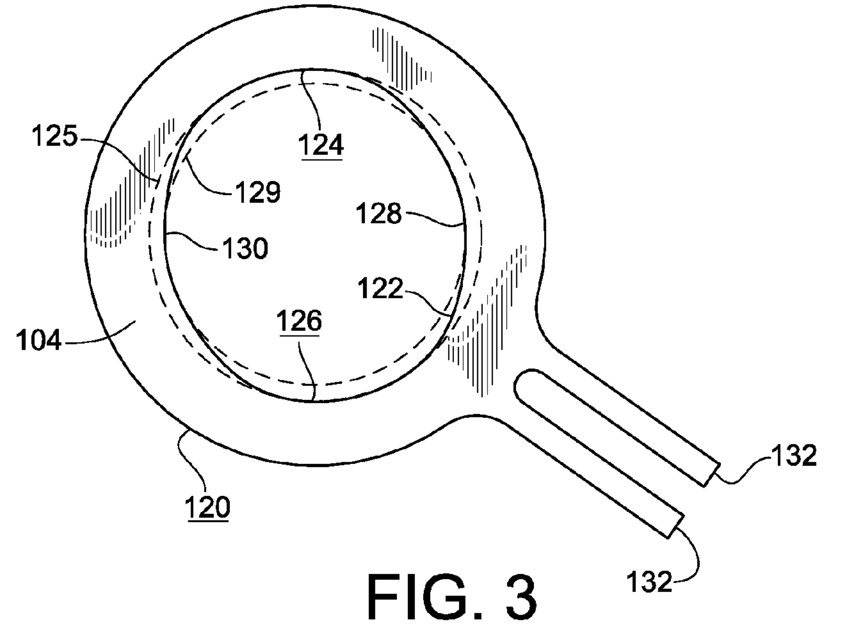
FIG. 3 is a plan view of a cam ring according to an alternate embodiment of the invention.

FIG. 3 illustrates the cam ring 104 according to an embodiment of the invention. The cam ring 104 has a circular outer diameter 120, and a dual-lobed inner diameter 122. The inner diameter 122 includes lobed portions 124, 126 and non-lobed portions 128, 130. The lobed portions 124, 126 define a major diameter 125, while the non-lobed portions 128, 130 define a minor diameter 129, wherein the major diameter 125 is larger than the minor diameter 129. The cam ring 104 has handle-like projections 132 for rotating the cam ring 104 while the pump is operating, so that pump displacement can be dynamically adjusted during pump operation. The C-shaped spacer 110 (shown in FIG. 1) has a notch, roughly 45-degree arc, taken out of the circular shape of the spacer 110. The handle-like projections 132 of the cam ring 104 is rotated within the 45-degree arcuate opening. The length of the arc in the spacer 110 in combination with the shape of the cam ring profile dictate the range of displacement that can be achieved. The cam ring 104 has an inner diameter 122 that is a lobed circle, wherein the inner diameter 122 includes two opposing lobes spaced 180 degrees apart from each other on the inner diameter 122.

Figure 4:
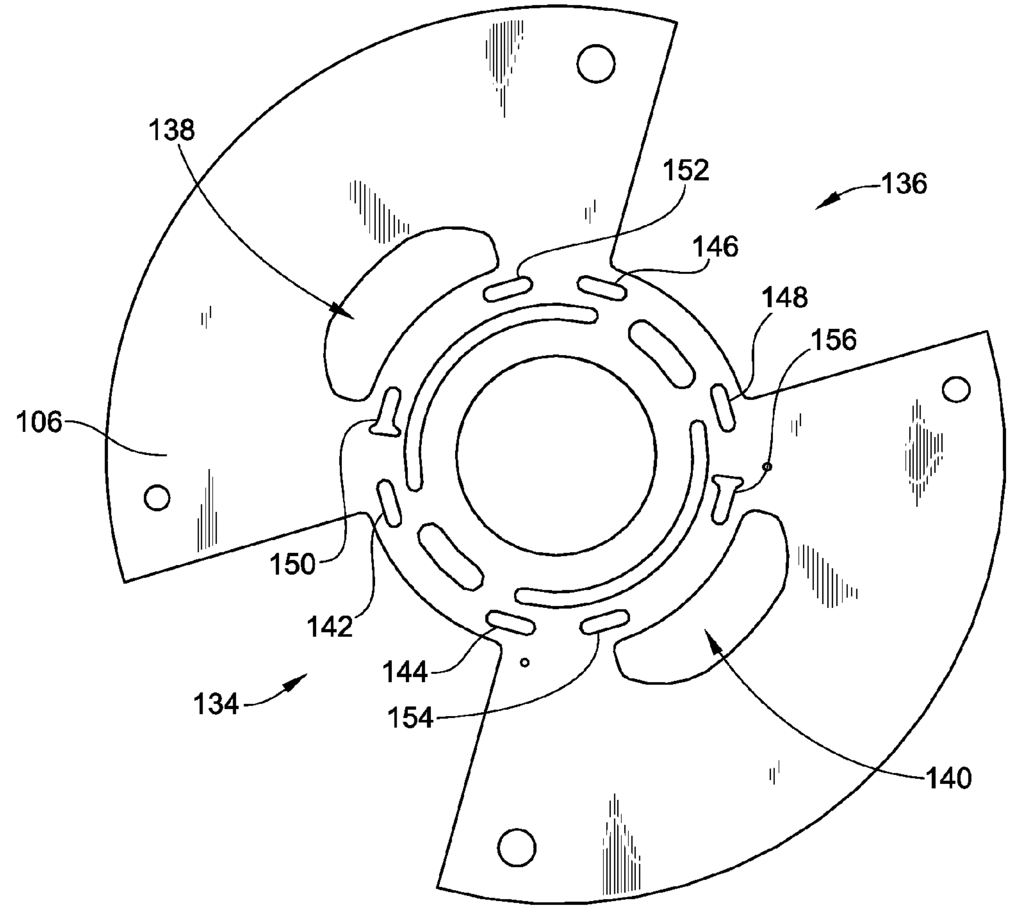
FIG. 4 is a plan view of a pressure plate according to an embodiment of the invention.

Referring to FIG. 1, pressure plates 106, 108 are positioned on either side of the rotor 102/cam ring 104/spacer 110 assembly. With respect to the interface with the rotor 102/cam ring 104 assembly, the pressure plates 106, 108 are identical. FIG. 4 is an illustration of the pressure plate 106 according to an embodiment of the invention. The pressure plate 106 includes two inlets 134, 136 and two outlets 138, 140. Inlet 134 is in fluid communication with two auxiliary intake ports 142, 144, while inlet 136 is in fluid communication with two auxiliary intake ports 146, 148. Similarly, outlet 138 is in fluid communication with two auxiliary discharge ports 150, 152, while outlet 140 is in fluid communication with two auxiliary discharge ports 154, 156. The auxiliary intake ports and auxiliary discharge ports 142-156 are located such that when the pressure plates 106, 108 are assembled to the rotor 102/cam ring 104 assembly, the rotation of the rotor 102 brings the auxiliary intake ports and auxiliary discharge ports 142-156 into fluid communication with each of the notched areas 118 on rotor 102.

The dual-lobe configuration of the cam ring 104 offers the potential for balancing rotor pressures during pump operation such that bearing loads are considerably reduced. When the pressure plate inlets 134, 136 are spaced 180° apart, and the outlets 138, 140 are also spaced 180 degrees apart, the pressures are balanced around the 360 degrees of the rotor. As such, the pressure-induced loads on the rotor 102, cam ring 104, and bearings (not shown) may be very small. This balanced pressure feature allows for the use of smaller, lighter bearings and drive shafts as compared to those typically used on pumps having single-lobe cam rings. And, because the dual-lobe cam ring design allows for two inlets and two outlets, the pump can provide the same output flow in a smaller package with a lower inlet pressure than the typical positive displacement pump with a single-lobe cam ring.

Figure 5:
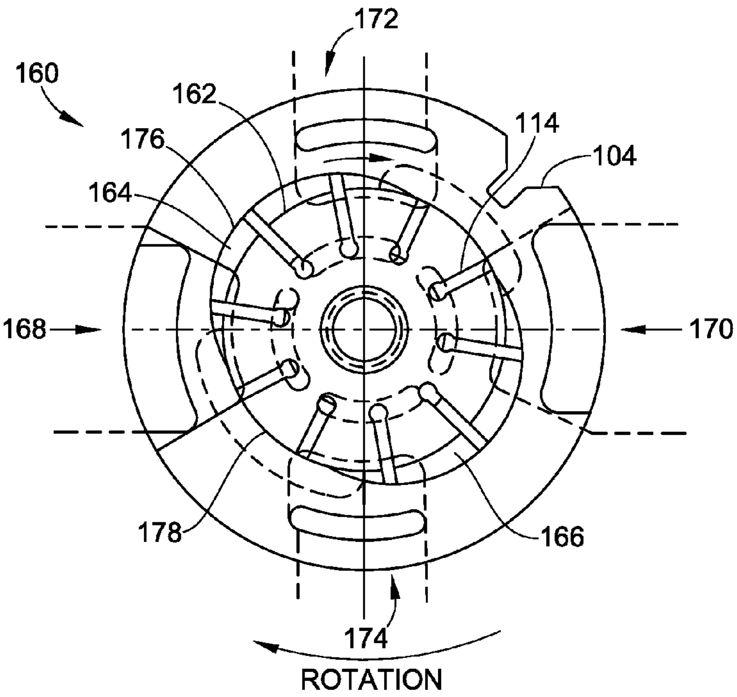
FIG. 5 PRIOR ART
FIG. 5 is a plan view of a prior art cam ring/rotor assembly.

FIG. 5 illustrates a prior art rotor/cam ring assembly 160. In operation, the rotation of rotor 162 causes the vanes 114 to alternately extend and retract as the vanes 114 move through pumping chambers 164, 166. For each pair of adjacent vanes 114, depending on the direction of rotation, one vane constitutes the leading vane, the other the trailing vane. As explained above, when the vanes 114 extend beyond the perimeter of the rotor 162, the space between the leading vane and the trailing vane defines a volume. Fluid entering the pumping chambers 164, 166 via pressure plate inlets 168, 170 fills this volume and is discharged at outlets 172, 174. The rotational velocity of rotor 162 generates such centrifugal force that the vanes 114 effectively seal against the inner diameter 122 (shown in FIG. 3) of cam ring 104. At the major diameter 176, the vanes 114 reach their maximum extension. After reaching maximum extension, the vanes 114 then begin retracting into slots 112 as they rotate through one of the pumping chambers 164, 166 toward the minor diameter 178 and through one of the discharge outlets 172, 174.

For any pair of adjacent vanes 114, as the leading and trailing vanes 114 retract, the volume therebetween is reduced and the pressure on the fluid in the volume is increased. Typically, the increased pressure forces the fluid into one of the outlets 172, 174. The variable displacement feature allows the cam ring 104 to be rotated so that, for each intake and discharge cycle, less than the maximum amount of fluid may be drawn in from each of the inlets 168, 170 during the intake cycle, and similarly, less than the maximum is discharged into the each of the outlets 172, 174 during the discharge cycle. But the use of this feature (i.e., rotating the cam ring 104) also means that the cam ring lobe position is altered with respect to the location of the inlet 168, 170 and outlet 172, 174, such that the vanes 114 start to expand before reaching the inlets 168, 170 and start to retract before reaching the outlets 172, 174.

In prior art systems such as that shown in FIG. 5, when the vanes 114 expand before reaching the inlets 168, 170, a rapid decrease in pressure occurs in the volume between the leading and trailing vane 114. Without fluid from the inlets 168, 170 to fill the expanding volumes between each pair of vanes in the pumping chambers 164, 166, the result is a rapid decompression leading to cavitation within the pumping chambers 164, 166. This cavitation places severe mechanical stresses on pump components, either damaging or significantly reducing the useful life of these components.

Conversely, when a pair of vanes 114 retracts before reaching the outlet 172, 174, the decreasing volume in the space between the leading and trailing vanes 114 causes a rapid increase in pressure. With no discharge outlet to relieve the rapidly rising pressure, the result is a pressure pulsation that, like cavitation, can damage the pump components or severely reduce the life of those components. For a variable displacement pump with a dual-lobe cam ring, the rapid cycling between pressure pulsation and cavitation leads to noisy and unreliable operation, or, in some cases, may even make the pump unusable.

Referring to FIG. 4, an embodiment of the pressure plate is configured to address the problems of cavitation and pressure pulsation common to prior art dual-lobe variable displacement pumps. Auxiliary intake ports 142, 144, 146, 148 are positioned near each of the two inlets 134, 136. Two auxiliary intake ports 142, 144 are in fluid communication with inlet 134, while the two other auxiliary intake ports 146, 148 are in fluid communication with inlet 136. Similarly, auxiliary discharge ports 150, 152, 154, 156 are positioned near each of the two outlets 138, 140. Auxiliary discharge ports 150, 152 are in fluid communication with outlet 138, while auxiliary discharge ports 154, 156 are in fluid communication with outlet 140.

Figure 6:
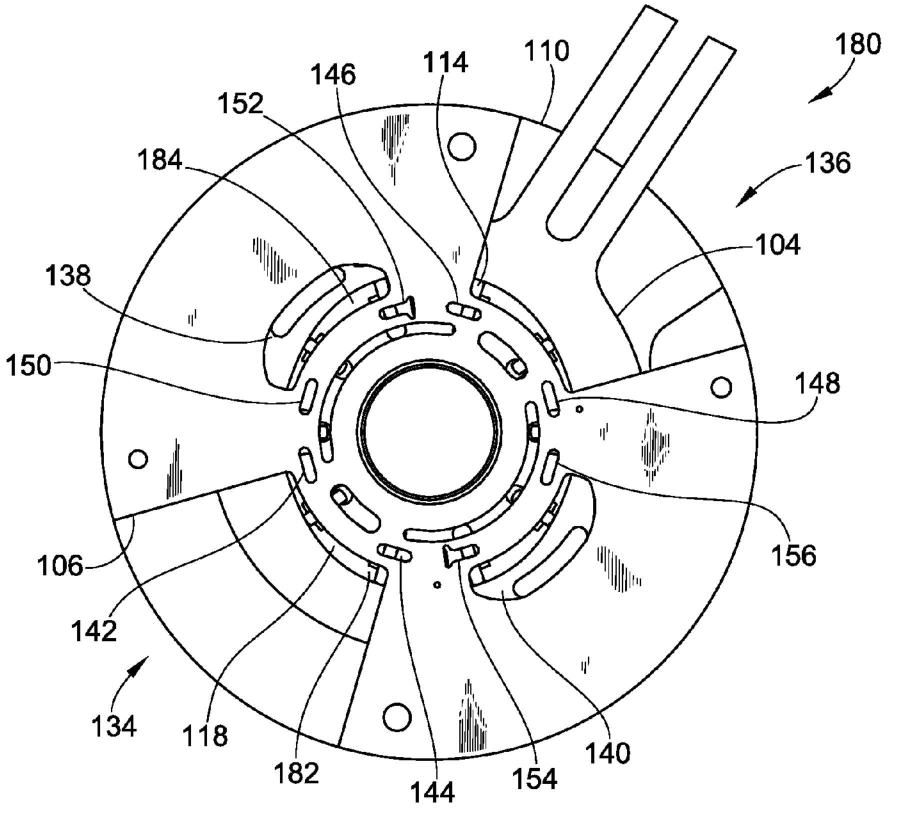
FIG. 6 is a plan view of a cam ring/rotor assembly according to an embodiment of the invention.

FIG. 6 illustrates a rotor/cam ring assembly 180 according to an embodiment of the invention. When the cam ring 104 is rotated slightly relative to the pressure plate 106, to slightly decrease the maximum displacement, the cam ring lobes 124, 126 are positioned such that the vanes 114 will start to extend before reaching either of the inlets 134, 136. However, the effects of rapid decompression in the volume between a pair of vanes 114 is reduced due to the auxiliary intake ports 142-148 being positioned to increase the available supply of fluid, via one of the notches 118 in the rotor 102, to one of the pumping chambers 182, 184 as required by the increased gain of the cam which results due to the turndown condition, or rotation of the cam ring 104.

In the same manner, pressure pulsation is effectively avoided due to the positioning of auxiliary discharge ports 150-156 near outlets 138, 140. The slight rotation of the cam ring 104 causes the rotating vanes 114 to start retracting before reaching either of the outlets 138, 140. Pressure pulsation is reduced due to the auxiliary discharge ports 150-156 being positioned such that, as the vanes 114 retract, pressure on the fluid between the vanes is relieved when the fluid is forced through one of the auxiliary discharge ports 150-156 to one of the outlets 138, 140. The discharge path provided by the auxiliary discharge ports 150-156, when the cam ring 104 is rotated away from maximum displacement, allows the pump to operate continuously without the damaging effects of pressure pulsation.

When the cam ring 104 is rotated substantially, the lobes 124, 126 may be positioned relative to the pressure plates 106, 108 such that a pair of vanes 114 may be at, or near, maximum extension when the volume between those vanes 114 initially comes into fluid communication with one of the inlets 134, 136 and its associated auxiliary intake ports 142-148 via the rotor notches 118. It then follows that the pair of vanes 114 would also start retracting while still rotating through one of the inlet 134, 136 regions causing some fluid to flow back into one of the inlets 134, 136 and the associated auxiliary intake port 142-148 during the intake cycle, thus effectively reducing the pump displacement. In this manner, the variable displacement concept is realized because the intake flow is returned to the inlet without doing any significant amount of work on the fluid.

As the rotation of the pair of vanes 114 takes the volume between those vanes 114 out of fluid communication with one of the inlets 134, 136 one of the associated auxiliary intake ports 142-148, the volume then comes into fluid communication with, and discharges fluid into, one of the outlets 138, 140 and one of the associated auxiliary discharge ports 150-156 via one of the rotor notches 118. The pair of vanes 114 will have retracted substantially by the time the volume between the vanes 114 comes into fluid communication with one of the outlets 138, 140 and associated auxiliary discharge ports 150-156. Having rotated through one of the pumping chambers 164, 166, the fully retracted vanes 114 pass through one of the non-lobed regions 128, 130 to the other of the pumping chambers 164, 166. When the leading vane 114 starts to extend into the other of the two pumping chambers 164, 166, the volume between the pair of vanes is still in fluid communication with one of the outlets 138, 140 and one of the associated auxiliary discharge ports 150-156. The pressure drop created by the expanding volume between the pair of vanes 114 causes some of the fluid from the outlet 138, 140 and from the associated auxiliary discharge port 150-156, via a rotor notch 118, to be pulled back into the pumping chamber 164, 166. But even where the cam ring 104 is rotated substantially, the auxiliary intake ports and auxiliary discharge ports 142-156 serve to reduce both the pressure pulsation and the cavitation that can severely limit the usefulness of variable-displacement, dual-lobe, single-ring vane pumps.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A pump comprising:

a pressure plate having two inlets and two outlets, wherein each of said two inlets has an auxiliary intake port in fluid communication with the respective said two inlets, and each of said two outlets has an auxiliary discharge port in fluid communication with the respective said two outlets;

a cam ring/rotor assembly adjacent to the pressure plate, the cam ring/rotor assembly comprising:

a rotatable cam ring having an opening;

a rotor disposed within the opening of the cam ring, the rotor having a plurality of radial slots; and a plurality of vanes configured to move within the plurality of radial slots;

wherein a pumping chamber is defined by a space between the rotor and the cam ring;

wherein the rotation of the rotor within the cam ring causes the plurality of vanes to radially extend and retract within the pumping chamber;

wherein the movement of the plurality of vanes and the rotation of the rotor is configured to discharge into the two outlets and the respective auxiliary discharge port a fluid drawn into the pumping chamber via the two inlets and the respective auxiliary intake port;

wherein the rotor includes a plurality of notched areas between adjacent radial slots; and wherein the rotor rotation causes the notched areas to be in fluid communication with the auxiliary intake ports and the auxiliary discharge ports.

2. The pump of claim 1, further comprising a spacer having a central opening configured to hold the rotatable cam ring, wherein the spacer is attached to the pressure plate.

3. The pump of claim 2, wherein the spacer allows the rotatable cam ring to rotate within an arcuate opening of the spacer.

4. The pump of claim 1, wherein the rotor is substantially circular, and wherein the cam ring opening is a lobed circle.

5. The pump of claim 4, wherein the cam ring opening has two lobes spaced 180 degrees apart.

6. The pump of claim 1, wherein the cam ring is configured to rotate to a plurality of positions relative to the pressure plate.

7. The pump of claim 6, wherein the cam ring position regulates the volume of fluid drawn into the pumping chamber from the two inlets.

8. The pump of claim 1, wherein the pressure plate is substantially circular.

9. The pump of claim 8, wherein the two inlets are spaced 180 degrees apart on the pressure plate, and the two outlets are spaced 180 degrees apart on the pressure plate.

10. The pump of claim 9, wherein the two inlets and two outlets are configured to balance the pressure on the cam ring and the rotor during pump operation.

11. The pump of claim 1, wherein the rotor has one of 10 of said radial slots and 12 of said radial slots.

12. A pump comprising:

a pair of pressure plates, each having a first inlet and a first outlet;

a cam ring having a dual-lobed opening and a handle configured to rotate the position of the cam ring;

a rotor having a plurality of radial slots and having a notch between each adjacent pair of radial slots, wherein the rotor is configured to rotate within the dual-lobed opening;

a plurality of vanes disposed within the rotor slots, the vanes configured to move within the slots;

wherein the cam ring and rotor are disposed between the pair of pressure plates;

wherein the rotation of the rotor and the movement of the vanes cause the intake of a fluid from the first inlet and the discharge of the fluid to the first outlet;

wherein each of the pair of pressure plates includes a second inlet spaced 180 degrees apart from the first inlet, and a second outlet spaced 180 degrees apart from the first outlet;

wherein each of said pair of pressure plates includes two auxiliary intake ports in fluid communication with each of said first and second inlet, and two auxiliary discharge ports in fluid communication with each of said first and second outlet; and wherein the rotation of the rotor causes the notches in the rotor to come into fluid communication with the two auxiliary intake ports and with the two auxiliary discharge ports.

13. The pump of claim 12, further comprising a spacer having a central opening, wherein the spacer is positioned between the pair of the pressure plates.

14. The pump of claim 13, wherein the handle is configured to rotate the cam ring within an arcuate opening in the spacer.

15. The pump of claim 12, wherein the rotation of the rotor and the movement of the plurality of vanes further causes the intake of fluid from the two auxiliary intake ports and the discharge of fluid to the two auxiliary discharge ports.

16. The pump of claim 12, wherein rotation of the cam ring is configured to alter the displacement of the pump.

17. The pump of claim 16, wherein the cam ring handle is configured to rotate the cam ring during pump operation.

* * * * *